Jan. 2, 1934.　　J. L. ANDERSON　　1,942,352
WELDING TORCH
Filed Aug. 2, 1930
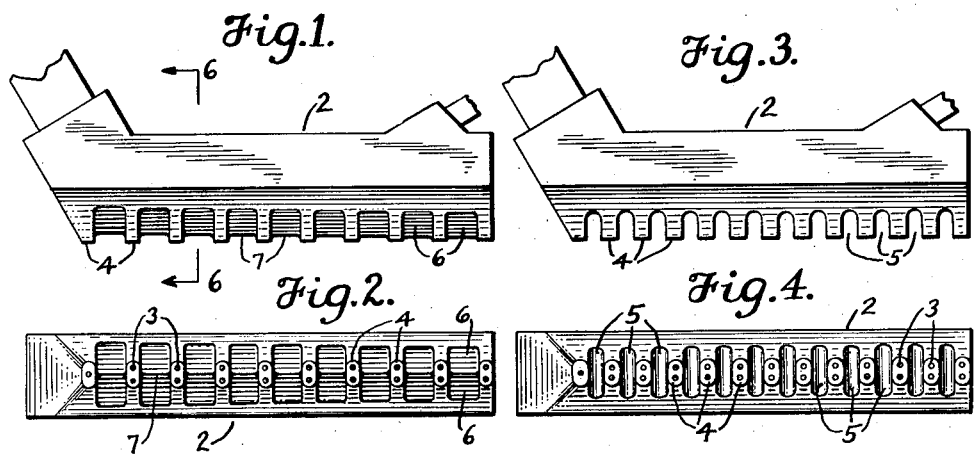
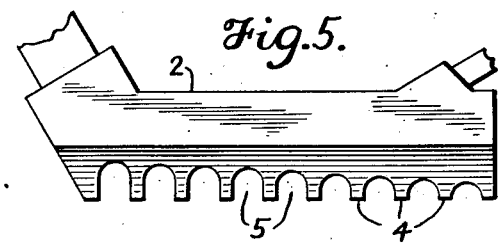
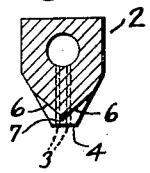

Patented Jan. 2, 1934

1,942,352

UNITED STATES PATENT OFFICE 1,942,352

WELDING TORCH

James L. Anderson, Tenafly, N. J., assignor to Air Reduction Company, Incorporated, New York, N. Y., a corporation of New York Application August 2, 1930. Serial No. 472,511

13 Claims. (Cl. 158—27.4)

This invention relates to oxy-fuel gas welders used in the art of "mechanical welding" of seams at high linear speeds of welding. The invention relates specifically to oxy-acetylene machine welding torches of the type in which an extended series, or multiple series, of small preheating and fusing jets are delivered from the face of the body of a tip or burner block, into which the orifices for these jets are drilled. A welding burner of this type is distinguished from that different type in which several individual nozzle tips are screwed into a block. The latter construction has a decided limitation in respect to the number of jets that can be delivered over a given length of seam, and in respect to the spacings and dispositions of the jets that can be secured, in addition to which there are difficulties and uncertainties in obtaining and keeping tight, nonleaking joints between the nozzles and the block. The heat conditions to which these " mechanical " welding burners, disposed as they are close to the seam and often hemmed in at the sides, are severe. The integral block type of tip lends itself to the provision of jets of any desired number, at any desired closeness of spacing, in any desired grouping or arrangement, and therefore makes it possible to produce perfect welds with the greatest economy and the greatest linear speed of welding, depending upon the particular nature of the work. It also avoids the problem of numerous joints adjacent the high heat.

In processes involving the use of oxy-fuel gas flames for fusion welding seams between contacting sheets or plates, or in pipe or tubing, and for similar purposes, it is necessary to provide suitable means to retain in substantially fixed relation to each other the parts to be welded together. In the case of sheets or plates, fixed clamps are generally positioned closely adjacent the edges to be united. The more proximate the positioning of the clamps to such edges the greater is the resultant efficiency in the operation and the accuracy and strength of the weld effected. Likewise, in the case of pipe or tube, which is manufactured by welding closed a seam formed by bending sheet or plate metal into tubular shape so that side edges of the metal are brought into proximate or contacting relation, it is necessary, in order to retain the edges in such relation during the welding operation, to provide some means, such as the so-called " welding rolls ", for holding or forcing the deformed metal to the desired contour with the side edges positioned for welding. Where such rolls or like means are utilized, they are formed to encompass and grip practically the entire surface of the tubularly formed metal with the exception of a very small portion in proximity to the seam. The smaller this portion and the closer the roll surface can be brought to the seam edges the greater will be the resultant accuracy and strength of the seam as finally welded.

It, therefore, becomes necessary, in welding the seam closed, where the edges are retained in any arrangement of work and apparatus such as described, to position the burner tip in close proximity to the faces of the clamps or rolls located at the seam edge. The closeness of approach of such tip to the clamps or rolls has been hampered by the inability of atmospheric air to have sufficient access between the tip and the body of the clamping means to burn closely adjacent the metal being welded, those gases resulting from incomplete combustion at the flame jets and known as the envelope gases. The envelope gases rise away from the metal being welded, and burn above and around the body of the tip, thus unnecessarily heating the tip body and wasting heat energy derivable from the gases.

During the heating of the metal portions to be welded, a slag results, either from the formation of oxide on the surface of the heated metal or by the separation of impurities in the metal when the latter becomes molten. Such slags are formed and may remain fluid, in some cases, at temperatures considerably lower than are necessary to melt the metal itself. The temperatures created by the combustion of the envelope gases rising and burning around the tip body are of a sufficient order to accomplish this result. Under the action of the intense heat of the flame jets, the slag, floating on the surface of the molten metal or suddenly separating and rising through the molten metal, often erupts explosively, or is sprayed about by the action of the continuous blast of the flame jets, or is otherwise forcibly ejected from the fluid mass while at the very high temperature of the weld. Much of this molten slag, or the molten metal itself, strikes that face of the burner block or tip from which the flame jets issue, and adheres. The quantity of slag so adhering to the burner face has, as one of its determinants, of course, the distance of the burner face from the exploding metal. The slag at times may be projected or may flow into the orifices from which the jets are issuing. Substantially complete stoppage of gas flow may result, or, if the pressure of the gas issuing from the orifice is sufficient, a hole will be blown through the slag so that the jet may continue burning. However, some of the slag in the latter case will remain adhering to the face of the burner tip around the orifice, so that the effective plane from which the jet issues will have been advanced toward the metallic edges to be heated. Since the distance of the flame tip from the metal is a substantially critical factor in such operations, and especially in the continuous operations of mechanical welding, an undesired change is thereby produced. Detrimental or uneconomical results may occur from dispersion of the liquid metal by too close contact of the high pressure jets therewith, or from other commonly known effects of the application of such gas jets in too close proximity to the part being heated.

Where a multiple orifice burner of the type shown in my Patent No. 1,516,486, dated November 25, 1924, is used, the slag, which may have adhered to the burner face at but one point, may build up along the burner face toward the other orifices, thus endangering the continued or effective operation of these orifices. Constant attention is thus required to forestall complete interruption of the burner operation. It is an object of this invention to construct a multiple jet burner in such manner that, should slag or like substances be projected at and adhere to the burner face from which the orifices open, such slag adherence will be confined to a limited area and will not spread from that area to other areas. For this purpose, the plane burner face from which the orifices open is cut across by a plurality of deep notches which divide the burner face into segregated orifice areas. Opening within each area may be one or more burner orifices. The notches in the burner face are of such depths that slag in any one area will be unable to build across the notch to orifices on adjacent surfaces. Their depth is such that atmospheric gases from above the burner may easily enter them and travel down to the jet or jets issuing from the burner face in proximity to the respective notch, thus assisting in securing complete combustion of the envelope gases in close proximity to the point of application of the welding flames.

In the type of burner described in my patent above referred to, two parallel lines of orifices, arranged in pairs to form files of two, are utilized. In such case, and also in many other similar arrangements, I have found it desirable to form the notches by two distinct, downwardly tending cuts, so that two faces, converging downwardly, form the upper wall of the notch. This is conducive to efficient guiding of the atmospheric air to the point of combustion of the issuing gases. Furthermore, slag, or the like, impelled upwardly out of the weld and striking the inclined faces, will be deflected away from the burner. The depth of the notches may vary at different positions along the burner face, in accordance with the degree of likelihood of slag being formed and being expelled from the melt, which is determined by the state of fusion of the metal beneath the burner at different points. The gradation in depth may be a regular one, if so desired, decreasing from the welding to the preheating end of the tip, since there would be a lesser probability of slag being sprayed upward at the latter end than at the former.

Other objects and features of this invention will be apparent to those skilled in the art.

The invention is not confined to the precise construction and arrangement of parts herein shown and described, nor to the various details thereof, as the same may be modified in various particulars without departing from the spirit and scope of the invention, one practical embodiment of which has been herein illustrated and described without attempting to show all the various forms and modifications in which the invention might be embodied.

In the drawing, wherein are disclosed preferred embodiments of the invention:

Fig. 1 is an elevational view of a burner tip, embodying the invention;

Fig. 2 is a bottom plan view thereof;

Fig. 3 is an elevational view of a burner tip, in which the invention, in modified form, has been embodied;

Fig. 4 is a bottom plan view of the burner tip shown in Fig. 3;

Fig. 5 is an elevational view of a turner tip embodying the invention in further modified form; and Fig. 6 is a cross-section taken on the line 6—6 of Fig. 1.

Considering Figs. 3, 4 and 5, the tip 2 is seen to be of the type disclosed in my patent above mentioned. It has been found that the provision of a plurality of orifices 3, opening from the plane bottom face 4 of the tip body, is necessary for the proper concentration of heating jets in relation to the metal to be melted. It was further the subject of my invention in said patent to arrange a plurality of series of such orifices so that one or more series would be positioned on each side of the center line of the seam to act directly upon the metal for bringing the same quickly to fusion temperature.

The metal of the body is cut back from the face 4 at a plurality of predetermined regions, to provide a series of notches 5 in the tip face, leaving sufficient metal in the plane of face 4 to provide for the drilling of the orifices. The amount of metal left in face 4 is reduced as much as is practicable, as by rounding off the metal projecting from the body of the tip on each side of the notches. Such notches may be cut straight across the face of the torch tip, as in Figs. 3, 4 and 5. Preferably, however, each notch is formed, as appears in Figs. 1, 2 and 6, by two cuts 6, made at angles to the side surfaces of the torch tip body and converging relatively to each other, so that they preferably meet at a common edge 7. By this construction, wedge-like portions are formed between those portions of the tip body through which the orifices are drilled.

The inclination of the surfaces 6 is such that slag, projected upwardly from the weld, would, in most cases, glance off and not adhere to them as it would if driven against a face disposed perpendicularly to its path of travel or at an angle less critical. If slag, or like foreign bodies, does adhere to the faces 6, it tends, under the heat prevailing, to run down these faces and drip off the ridges 7 upon the metal being welded. The wedge faces therefore provide a conducting course for guiding such slag so as to avoid danger of its flowing down upon those portions of the tip faces wherein the orifices are located, and thus remove the danger of clogging such orifices.

The amount of depression (or elevation) of each notch may be varied as desired, but, as shown in Fig. 5, the depths of successive notches may be increased progressively along the tip from the preheating front end to the welding or rear end of the burner. Since the necessity for protecting the burner orifices increases as the heating beneath the respective orifices, and therefore as the molten condition of the metal and the amount of slag beneath the orifices, increases, it can easily be understood that the depth of notch is particularly needed at the welding, or rear, end of the torch tip. Here exists the maximum amount of heat resulting from the combination of envelope gas flame, welding flame and heat radiated from the molten metal; in consequence of which slag attains its greatest fluidity and displays its greatest activity at this region.

Manifestly, however, all or a majority of the notches may be of substantially the same depth, as in Fig. 3, the depth of all being that desired at the region of greatest activity; or the depth of different notches may be varied more or less arbitrarily provided that individual notches are deep enough to cope with the conditions existing at the different regions.

When the construction shown in Figs. 1, 2 and 6 is employed, the notches can be considerably shallower at the ridges 7 midway between the sides of the tip body, since the sloping faces 6 give the effect of depth. Obviously, a combination of straight-across notches and converging-faced notches may be embodied in the same tip, and naturally, also, the inclination of the faces may be steeper in some notches than in others.

The notches are intended to be extended to the side faces of the tip body, and preferably in the manner shown in Figs. 2, 4 and 6. By such devices, air from a level above the orifice face will be given additional entry to the orifice face, and will materially assist in furthering the combustion of the envelope gases in close proximity to the metal surface against which the welding flames are directed. The atmospheric gases will flow down along the side faces of the burner body, and some of them will pass into the notches, then flow down and around the burning jets, completing to a substantial degree the combustion of the envelope gases adjacent the jets. This result is beneficial in practically all arrangements in which tips of the type herein set forth may be utilized, but the construction markedly increases the efficiency of the welding operation in those cases where the orifice face is positioned below the level of and between the faces of a pair of closely proximate clamps or welding rolls. Where the side faces of the notches are angularly disposed, they will function to direct air from above the tip downwardly to the burning gases with a minimum of swirling, so that the envelope gases will be burned more efficiently in the neighborhood of the welding jets.

As many changes could be made in the construction and many different embodiments of the invention may be designed without departing from the scope of the invention as defined in the accompanying claims, the matter set forth by the above description may be interpreted as illustrative of an operative embodiment of the invention rather than in a limiting sense.

I claim:

1. A welding burner of the type described comprising an elongated burner body having numerous jet orifices opening through a face which can be brought very close to the work, and recesses between the orifices to interrupt the building up of slag along the body, said recesses being located in position to conduct air to the regions of said orifices.

2. A welding burner of the type described comprising a jet block having a multiplicity of jet orifices spaced relatively closely and opening through a face which can be brought very close to the work, and having recesses in the body of said block between the orifices and deep enough to interrupt the building up along said body of portions of slag or other foreign matter which may adhere to said block during a welding operation.

3. A welding burner of the type described having a body portion from a face of which open a plurality of relatively closely spaced burner orifices, and a plurality of recesses cut back from said face to segregate said orifices against the building up of slag, the body portion of the burner being so shaped that the face of said burner can be brought very close to the work.

4. A welding burner of the type described comprising an elongated body having a face from which open burner orifices arranged in rows lengthwise of the body, and a plurality of cut-out portions in said face to segregate said orifices into groups spaced lengthwise of the tip.

5. A welding burner of the type described having a body portion from a face of which open a plurality of burner orifices, arranged in rows extending longitudinally and spread transversely of said tip, and a plurality of deep cut-out portions in said face to segregate said orifices.

6. In a welding torch of the type described, means for producing a plurality of high temperature flame jets comprising a body having a plurality of jet orifices opening from a face thereof in substantially the same plane, said orifices being formed to direct the jets therefrom substantially perpendicular to the portions to be heated, and said face being deeply recessed between groups of orifices.

7. In a welding torch of the type described, a body having numerous jet orifices opening from a face thereof, and recesses of different depths between orifice portions of the face adapted to minimize the building up of slag and oxid and to admit air.

8. In a welding torch of the type described, a body having a plurality of series of jet orifices opening therefrom, said orifices being formed to direct the jets therefrom substantially perpendicular to the portions to be heated, and said body being formed with one or more deep depressions to segregate said orifices into a plurality of groups.

9. A welding burner of the type described comprising an elongated body having a face with numerous jet orifices opening therefrom and being formed with deep depressions between said orifices, and said body portion at said depressions being formed with face portions converging to a position above the level of said face.

10. In a welding torch of the type described, means for producing a plurality of high temperature flame jets comprising a body having a plurality of jet directive orifices opening therefrom, said orifices being formed to direct the jets therefrom substantially perpendicular to the portions to be heated thereby, said body being formed with one or more depressions to segregate said orifices into a plurality of groups, and said body at said depressions being formed with downwardly converging faces.

11. A torch tip of the type described comprising a body portion having a face lying substantially in a single plane, said face having a plurality of orifices opening therefrom and being formed with a plurality of depressions between said orifices, and said body porton at said depressions being formed with converging face portions.

12. In a welding torch of the type described, means for producing a plurality of high temperature flame jets comprising a body having a plurality of jet orifices opening from a face thereof, said orifices being arranged in lines longitudinally of said body and being formed to direct the jets vertically downward therefrom to the portions to be heated thereby, said face being formed with one or more depressions to provide a face which is discontinuous between groups of orifices, said body at said depressions being formed with faces converged downwardly to a position located above the plane of the face from which said orifices open.

13. In a welding torch of the type described, a block having numerous flame jet orifices discharging at the face of the block body, and provided with openings in the body adapted to admit air from above between the jets to promote the burning of the envelope gases close to the work.

JAMES L. ANDERSON.